Sept. 4, 1951 G. B. KUETER 2,567,020
APPARATUS FOR FORMING CONTINUOUS WELDED TUBINGS
Filed Feb. 11, 1950 2 Sheets-Sheet 1
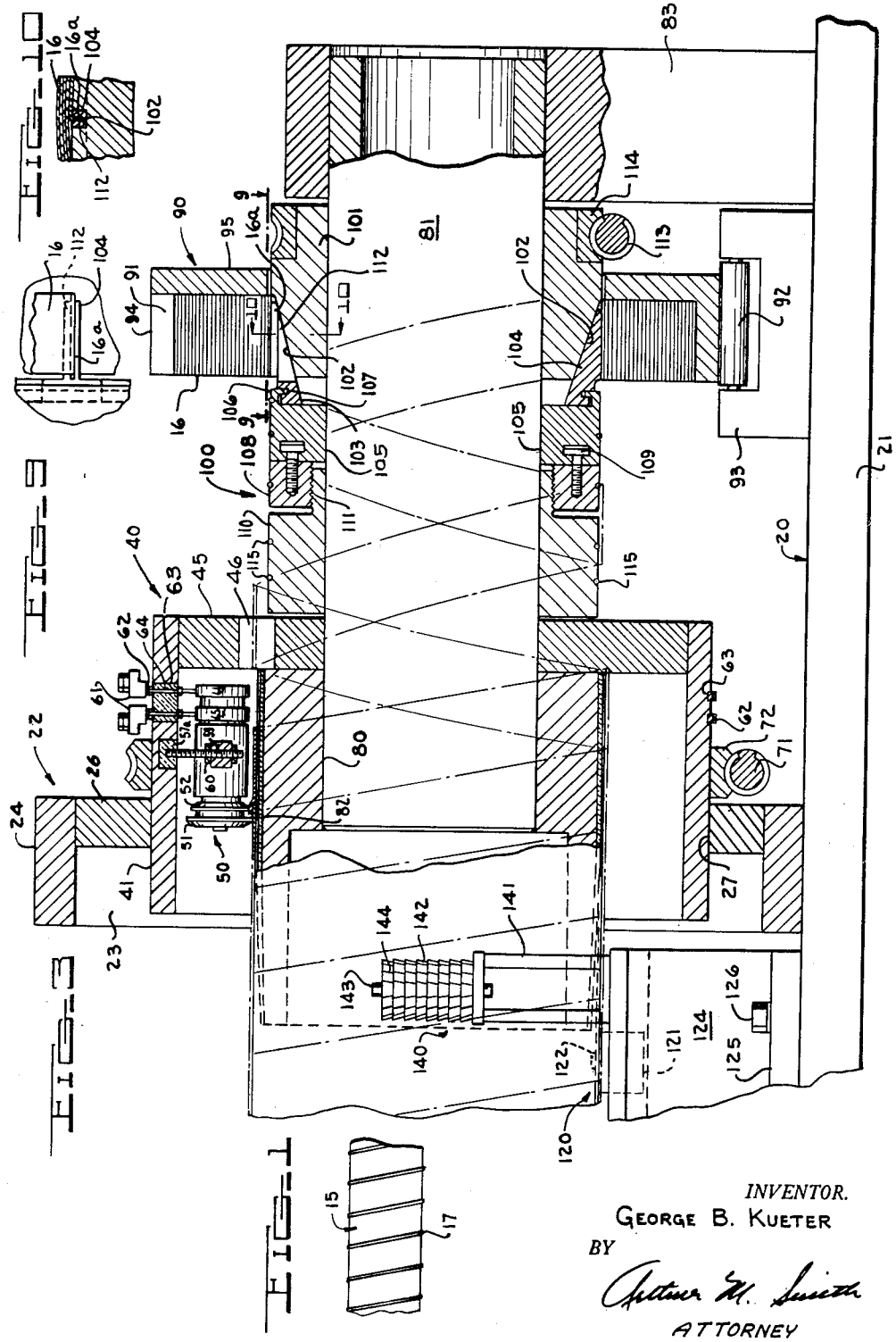
INVENTOR.
GEORGE B. KUETER
BY
Arthur M. Smith
ATTORNEY Sept. 4, 1951 G. B. KUETER 2,567,020
APPARATUS FOR FORMING CONTINUOUS WELDED TUBINGS
Filed Feb. 11, 1950 2 Sheets-Sheet 2
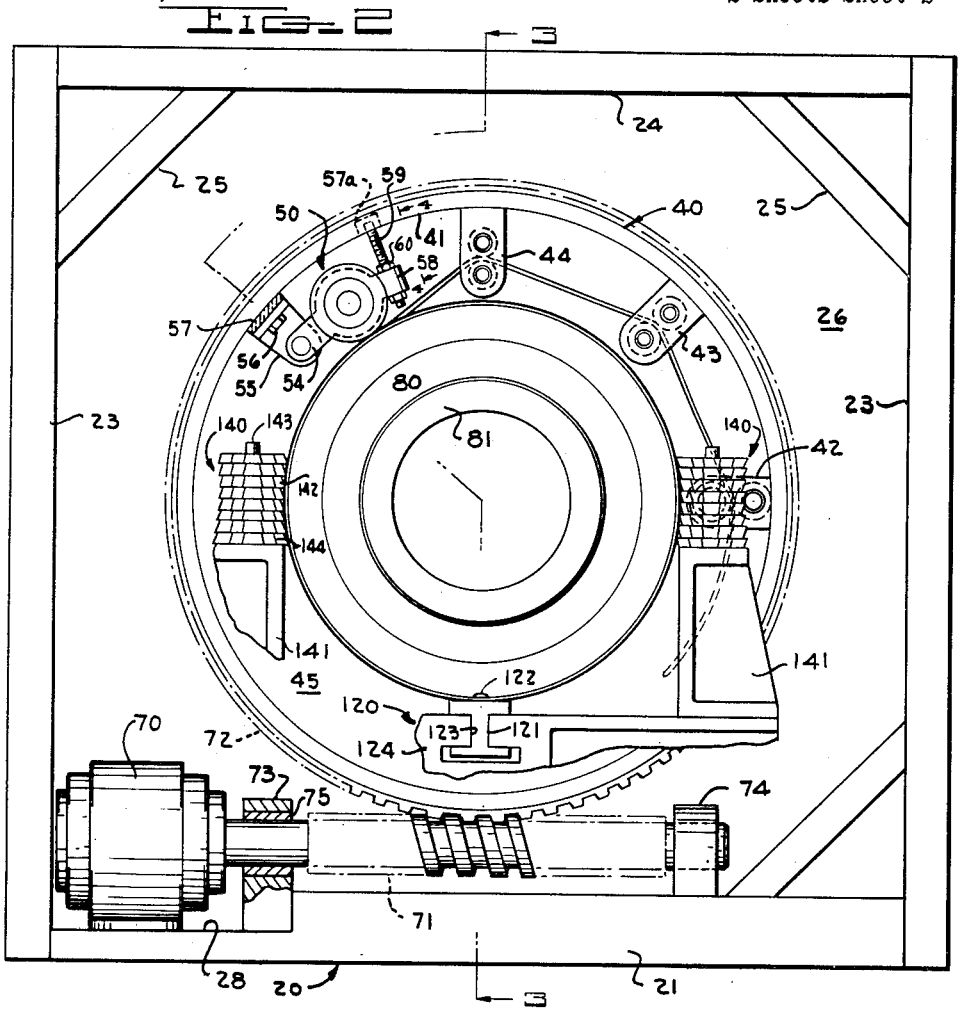
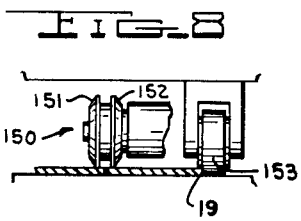
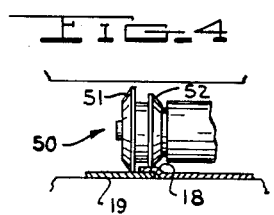
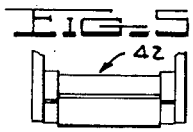 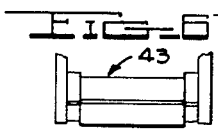 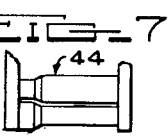
*INVENTOR.*
GEORGE B. KUETER
BY
*ATTORNEY*

Patented Sept. 4, 1951

2,567,020

UNITED STATES PATENT OFFICE 2,567,020

APPARATUS FOR FORMING CONTINUOUS WELDED TUBING

George B. Kueter, Dearborn, Mich.

Application February 11, 1950, Serial No. 143,638

8 Claims. (Cl. 219—6)

1

This invention relates generally to a machine for manufacturing tubes or pipes and more particularly to a tube or pipe making machine in which the tube is formed from spirally wound strip material and in which the seams of the tube are welded to provide a secure and fluid-tight helical joint.

Numerous machines have been previously proposed for manufacturing pipe or tubing from strip material by helically winding the strip and in some manner joining the adjacent edges to form a helical seam. In general, these machines are unable to produce a continuous length of tubing since it is necessary that the finished tubing rotate as it leaves the machine and accordingly it must be supported for rotation along its entire length. Instead, tubing was manufactured by the above process in relatively short lengths and the plurality of lengths fitted and joined together to give the desired length of tubing.

The prior machines are also unsatisfactory in that only small quantities of strip material can be supplied to the machine at any one time. The operation of the machine accordingly must be frequently interrupted to supply additional strip material to the machine during the manufacture of a relatively short length of tubing.

In addition, with most prior constructions, it is not feasible to provide large quantities of strip material stock to the machine when employing a rotatable forming head. With the latter construction, it is necessary to wrap the strip material around the forming mandrel prior to its entry into the forming head proper. One means of wrapping the material around the mandrel would be to carry the coil of material on a spool, which in turn is eccentrically supported on the forming head. This construction, however, substantially limits the maximum weight of the strip material coil which can be used due to unbalancing of the rotatable head.

The present invention utilizes a magazine which is positioned concentric with the forming mandrel and thus the strip material may be drawn from the magazine as it is formed by the forming head without any appreciable rotation of the magazine. This construction would normally require that the machine be disassembled in order that additional strip material be wrapped around the mandrel since it is necessary to support the forming mandrel at the feed end thereof. However, the present invention instead utilizes a novel rewinding mechanism which permits rapid refilling of the material magazine without disassembly of the machine.

Many of the prior machines of this general type join the adjacent edges of the helically wound strip material by folding and interlocking the adjoining spiral edges. These machines have the further disadvantage that a relatively sturdy construction is necessary for the machine, even when forming tubing from rather light or thin stock. The machines are normally not suitable for the manufacture of relatively thick walled tubing or pipe due to the high stresses which are necessarily imposed on the machine parts, and particularly on the forming head and forming tools during rotation of the latter relative to the material being formed.

It is accordingly, a primary object of the present invention to provide a machine for the manufacture of tubes or pipes which is adapted to form a flat strip stock into a continuous helically wound tube and which will continuously join the abutting edges of the stock to produce a secure fluid-tight seam and without the necessity for folding both of the adjoining edges of the stock in order to interlock the same.

Another object of the present invention is to provide a machine adapted to produce a continuous length of pipe by successively joining, preferably by welding, the unfinished end of the formed pipe with additional lengths of strip material.

Another object is to provide a machine in which the tube is ejected from the machine without rotation, thus obviating any necessity for a special supporting structure for the finished pipe and permitting substantially immediate installation thereof. The latter object is particularly desirable when the tubing or pipe is employed for subterranean or submarine pipe lines since the tubing may move out of the machine directly into a predug trench or into the water. The tubing may be formed, laid and the trench filled without requiring any special handling.

Still another object of this invention is to provide a machine adapted to produce a tubing of the above type from easily transported and relatively inexpensive strip material and which is formed having strong fluid-tight seams along the entire edges of the spiral convolutions.

Another object is to provide a cylindrical strip stock magazine which may be positioned concentric with the forming mandrel of the machine so that the strip material may be drawn from the magazine during operation of the machine without requiring any substantial rotation of the magazine and stock therein.

Another object of the invention is to provide a simple and efficient means for refilling the magazine with additional strip material without necessitating disassembly of the machine.

Another object is to provide a pipe forming machine which is characterized by simplicity and economy of construction and operation and which may form pipe from relatively heavy stock without being unduly sturdy in construction.

Other objects of this invention will appear in the following description and appended claims, reference being had to the accompanying drawings forming a part of this specification wherein like reference characters designate corresponding parts in the several views.

In the drawings:

Fig. 1 is a fragmentary front elevation of a portion of a tube formed by a machine embodying the features of the present invention.

Fig. 2 is a vertical section of the tube forming machine of the present invention and showing the circumferential and radial spacing of the guide rollers and welding apparatus.

Fig. 3 is a section taken substantially on the line 3—3 of Fig. 2.

Fig. 4 is an enlarged elevation of the welding apparatus taken on the line 4—4 of Fig. 2.

Figs. 5, 6 and 7 include a plurality of elevational views illustrating the various sets of rollers for guiding and forming the strip material.

Fig. 8 is a fragmentary sectional view of a modification of the invention and showing a welding apparatus for butt welding the strip material.

Fig. 9 is a fragmentary plan view taken substantially on the line 9—9 of Fig. 3.

Fig. 10 is a fragmentary sectional view taken substantially on the line 10—10 of Fig. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The machine of the present invention is adapted to utilize relatively inexpensive and easily handled strip material, preferably in coils, and form the material into a continuous tube or pipe of any desired length. The machine is thus particularly, but not exclusively, well adapted for the manufacture of tubes or pipe directly at the place or location that it is desired to install the same. The tube is formed by the machine by spirally winding the material on a mandrel and joining the adjacent or abutting edges thereof. According to this invention, the edges are joined by a suitable welding apparatus mounted within a forming head and rotatable relative to a supporting structure. The latter may be stationary or, preferably, it may be mobile so that the tube or pipe may be laid or installed immediately upon its formation. In the latter instance, the supporting structure may be moved in accordance with the velocity of movement of the finished tube out of the machine.

In the specific construction which is shown in the drawings and which illustrates the features of this invention, the machine comprises generally a supporting structure 20; a rotatable forming head 40 rotatably mounted on the supporting structure; a stationary forming mandrel 80 mounted on the supporting structure 20 and extending into the forming head 40; a stock retaining magazine 90 positioned in axial alignment with the forming mandrel 80 and supported for rotation on the supporting structure 20; and a rewinding mechanism indicated generally by the reference character 100 for refilling the magazine with additional strip stock.

In the normal operation of the machine, the tube or pipe 15, fragmentarily shown in Fig. 1, is formed automatically in response to rotation of the forming head 40 relative to the forming mandrel 80.

The strip material is progressively drawn out of the magazine 90 from the innermost convolutions of the coil 16 to the outermost convolutions thereof and moves axially of the mandrel into the forming head as shown in phantom in Fig. 3.

A welding apparatus 50 is secured within the cylindrical forming head 40 and effects a fusion or welding of the engaged edged portions of the strip material to form a fluid-tight and strong seam 17. The finished tube moves without restraint out of the machine as additional portions of the tube are formed and the operation may continue on the same tube by merely replenishing the supply of strip material in the stock magazine 90 and welding or otherwise securing the finished tube to the innermost end of the new coil 16 of material.

The finished tube or pipe is prevented from rotation by one or both of two mechanisms. The first mechanism is normally only utilized in the initial formation of the tube and comprises the horizontally slidable guide mechanism 120 which is adapted to be secured to the finished end of the pipe. The second mechanism comprises a plurality of sets of serrated discs 140 which grip the outer surface of the finished tube and allow axial movement thereof while preventing rotary movement of the same. These sets of serrated discs 140 have the additional function of controlling the axial movement of the finished tube so that pressures at the point of weld between the engaging edges of the strip material may be varied by increasing or decreasing the velocity of the finished tube out of the machine.

With regard to the specific modification of the present invention which is illustrated in the drawings and with particular reference to Figs. 2 and 3, the supporting structure 20 comprises a substantially rectangular base 21 and a vertical bearing frame 22 extending upwardly from the base and rigidly secured thereto, such as by welding. The vertical frame 22 is formed by a plurality of plates 23 and 24, suitably welded together and braced at the corners thereof by the braces 25. The vertical frame is also provided with a transverse vertical plate 26 having a central opening 27 which provides a bearing surface for journaling the cylindrical forming head 40.

The supporting structure may be mobilized if desired and such a modification could be made without departing in any way from the present invention.

The forming head 40 comprises generally a cylindrical body 41 journaled for rotation in the bearing frame 22 of the supporting structure 20 and having mounted therein a welding apparatus 50 and a plurality of guide and form rollers 42, 43 and 44. (See also Figs. 5, 6 and 7.) As is believed apparent, this particular construction of the forming head is designed for the manufacture of tubing in which the seam is lap welded. If it is desired to butt weld the edges of the strip material, the electrode rollers 51 and 52 of the welding apparatus may be replaced with rollers of equal diameter, as shown in the modification of Fig. 8 and the forming rollers 44 may be either eliminated or replaced by additional guide rollers.

In the normal operation of the machine, the strip stock 16 is passed successively through the guide rollers 42 and 43 and then through the form rollers 44. The form rollers 44 form a raised portion 18 (see Fig. 4) on the leading edge of the strip material which is adapted to overlap the adjacent trailing edge 19 of the next convolution of material. The material is then passed under the rollers 51 and 52 of the welding apparatus which fuse the overlapping portions of the strip material and form the rigid helical seam 17 of the finished pipe.

With reference particularly to Fig. 2, it will be seen that all of the above guiding and forming operations are performed at a point spaced radially outward from the circumference of the finished pipe. By such construction, the lower portions of the various rollers will not interfere in any way with the trailing edge of the convolution of strip material being welded.

The welding apparatus 50, forming rollers 44 and guide rollers 42 and 43 are also axially spaced within the cylindrical body 41 to compensate for the pitch of the helically wound strip material.

The welding apparatus 50 may be of any conventional design or type, such as electric weld, cold weld or the like. The welding apparatus 50 illustrated herein is electrical and is preferably provided with a transformer within its housing so that high voltage power may be utilized therewith. The roller electrodes 51 and 52 of the welding apparatus are preferably motor driven by a self contained motor and automatically drive the same at a peripheral velocity corresponding to the velocity of movement between the welding apparatus and strip material.

As shown particularly in Figs. 2 and 3, the welding apparatus 50 is adjustably mounted within the cylindrical body of the forming head so as to adjust the pressure of the roller electrodes 52 and 51 on the strip material. The left end of the welding apparatus, as viewed in Fig. 2, is provided with an extension 54 which pivotally connects to a bracket 55. The latter is rigidly secured to the cylindrical body 41 by the bolts 56 and is insulated from the body by the insulated pad 57. The opposite end of the welding apparatus is provided with a boss 58. A stud 59, rigidly secured to the cylindrical body, extends into the boss and is provided with a pair of nuts 60 which may be adjusted on the stud 59 to pivot the welding apparatus 50 relative to the bracket 55 and thus effect adjustment of the same. The stud is insulated from the cylindrical body by the insulation 57a.

Electrical power is supplied to the welding apparatus through the terminals 61 (see Fig. 3) which slidably contact the slip rings 62 on the outer surface of the cylindrical body 41. The slip rings 62 are insulated from the body 41 by the insulating strip 63 and connect to the brushes 64 which engage the slip rings 65 and 66 on the welding apparatus 50.

The rotatable forming head 40 is also provided with an annular bearing ring 45 which is journaled on the shaft 81 of the stationary mandrel 80 and which is provided with a slot 46 through which the unfinished strip material enters the forming head 40.

The forming head 40 is driven by the prime mover 70 through the worm gear 71 which meshes with the gears 72 on the periphery of the forming head 40. The prime mover 70, such as an electric motor, is secured to the base 21 of the supporting structure 20 within the recess 28 therein and the worm gear 71 is journaled for rotation in the bearing brackets 73 and 74 also secured to the supporting structure 20. Suitable bearings 75 are provided in the brackets 73 and 74.

The stationary mandrel 80 is positioned within the forming head 40 and is provided with an insulating sleeve 82 adapted to insulate the tube being formed from the metallic parts of the machine. While current may flow spirally around the material and thence through remote parts of the machine, it is normally not necessary to insulate the entire machine since the current is short circuited by the edges of the material being welded. The outer end of mandrel 80 is tapered, as is the insulating sleeve 82, to permit free movement of the finished tube relative thereto after it has been welded by the welding apparatus 50.

The mandrel is supported on the base of the supporting structure by the shaft 81 and the upright 83.

The stock magazine 90 of the machine is positioned in axial alignment with the forming mandrel and is concentric with the shaft 81 supporting the mandrel 80. The magazine 90 is supported by a plurality of rollers 92 and may be driven thereby when desired to take up any slack or looseness in the strip material that may occur during normal operation of the machine.

The magazine 90 is formed with a cylindrical outer wall 94 and an inwardly extending rear wall 95. It is open on its forward end to permit withdrawal of the strip material during operation of the machine. A slot 91 is provided in the outer wall 94 through which additional strip material may enter the magazine when it is desired to refill the same.

The rollers 92 are mounted on the base 21 of the supporting structure 20 and are journaled for rotation by the bracket 93. This bracket 93 preferably encloses a suitable motor or other prime mover for driving the magazine when desired.

The rewinding mechanism indicated generally by the reference character 100 comprises the rotatable ring 101 journaled on the shaft 81 of the stationary mandrel 80 and is provided with a plurality of inclined camming grooves 102 within which the collapsible jaws 103 and 104 are adapted to move; a collar 105 also journaled on the shaft 81 and having an annular inwardly depending flange 106 engaged within a groove 107 in the collapsible jaws 103 and 104 for effecting sliding movement of the jaws within the camming grooves 102; a nut 108 secured to the collar 105 by a plurality of bolts 109; and a strip material guide sleeve 110 fixed to the shaft 81 and provided with a threaded extension 111 which cooperates with the threads on the nut 108 to effect longitudinal movement of the jaws 102 and 103 and a consequent radial movement thereof in response to rotation of the nut 108. At least one of the jaws 102 is provided with a longitudinal groove 112 adapted to receive a bent end 16a of the strip material during refilling of the magazine 90.

A driving mechanism is also provided for rotating the ring and jaws during the rewinding operation. This mechanism comprises a worm gear 113 which meshes with the peripheral gears 114 on the ring 101 and which is adapted to be driven by any suitable prime mover (not shown).

The guide sleeve 110, nut 108, and collar 105 are each provided with a plurality of balls 115 partially embedded in the outer surfaces thereof to permit relatively frictionless movement of the unfinished strip material while it is moved from the magazine into the forming head.

In refilling the magazine 90 with additional strip material 16, the free end 16a of the material is passed through the slot 91 in the cylindrical wall 94 of the magazine and positioned in the groove 112 formed in the collapsible jaw 103. The nut 108 is rotated relative to the guide sleeve 110, moving the jaws 103 and 104 rearwardly and, accordingly, radially outwardly.

The ring 101 and jaws 103 and 104 therein are then rotated by the worm gear 113, while the magazine 90 is held against rotation by the rollers 92. After the magazine is filled, the nut 108 is returned to the position shown in Fig. 3, retracting the jaws 103 and 104 thus leaving an annular space between the strip material and the jaws. The inner end 16a of the strip material is then passed through the forming head 40, as described above, or is attached to the finished tube, as the case may be.

In order to prevent rotation of the finished tube when the latter is in its initial stages of formation, a slidable guide mechanism 120 is provided which includes a T slide 121 which is adapted for connection with the finished end of the tube or pipe 15, such as by the stud 122. The slide 121 is slidably received within the T guide slot 123, in the bracket 124, Figure 2. As shown in Figure 3, the T guide is provided with a base flange 125 which is bolted to the base 21 by a plurality of bolts 126.

Another provision to prevent rotation of the finished tube, particularly after the guide 121 has left the slot 123, comprises a plurality of sets of beveled discs 140, each supported by a bracket 141 mounted on the bracket 124. The individual discs 142 are rotatable upon the shaft 143 and may be power driven, if desired. Each of the discs 142 is provided with serrations 144 to facilitate gripping of the external surface of the tube 15 being formed. When it is desired to power drive the discs, the speed thereof may correspond to the normal speed of movement of the finished pipe or may be adjusted to increase the pressure at the point of welding as in the case of butt welding.

In the beginning of the operation of the machine, the strip stock 16 is looped around the stationary mandrel 80 and passed through the guide rollers 42 and 43, the forming rollers 44 and beneath the electrodes 51 and 52 of the welding apparatus 50. The end 16a of the material is then secured to the slide 121 by means of the bolt 122 to anchor the same against rotation but to permit free axial movement thereof. From this point, the production of tube by the machine continues automatically in response to rotation of the forming head 40 by the motor 70.

After a sufficient length of pipe has been finished, the slide 121 may be removed and rotation is prevent by the mass of the tube itself as well as by the sets of serrated discs 140.

Continuity of the pipe production may be maintained by welding or otherwise securing an additional coil of strip material 16 to the unfinished end of the preceding coil.

Fig. 8 illustrates the invention employing butt welding apparatus 150 having the roller electrodes 151 and 152 of equal diameter. In this modification, the forming rollers 44 are eliminated but may be replaced by a set of guide rollers, if desired. Also, the sets of guide rollers 42 and 43 may be replaced by a single roller, if desired. Preferably, a guide roller 153 is provided which engages the trailing edge 19 of the stock and permits application of a positive pressure at the point of weld, such as in cooperation with the sets of serrated discs 140.

The finished tube 15 may be protected against corrosion, such as by spraying with paint or by wrapping with one or more layers of suitable insulation.

It may be mentioned here, that the design of the machine permits any number of additional operations which may be performed simultaneously with the formation of the pipe, such as sandblasting or machining of the welded seams. In the case of a heavy, thick walled pipe, it may be desired to provide a means for threading or cutting off the finished tube. These tools may be mounted on a bed, to slide along with the axial motion of pipe while performing their specific operations.

The forming rollers or the material being formed may be lubricated by any of the well known means without departing from the present invention. Moreover, additional rollers or welding electrodes or additional sets of discs 140 may be employed if desired or the specific construction of the rollers and electrodes may be altered to accommodate stock of various thicknesses or to produce tubing of various diameters or materials.

The tube forming machine described above is simple, efficient and economical and is well adapted to produce pipe or tubing having an extremely strong and fluid-tight seam. The machine is further adapted to produce tubing from easily transported coils of sheet material and the finished tube formed thereby may be readily installed or laid while still connected to an unfinished coil of strip material. The machine may be mobile and preferably be movable at a speed equivalent to the speed of relative movement between the tube being formed and the machine. The machine is accordingly well adapted for progressively producing pipes used for transcontinental pipelines in which case the trench may be dug, the pipe formed and laid in the trench, and the trench thereafter filled while the pipe is still connected to an unfinished coil of material. The machine may also be used for manufacturing and laying pipelines under water.

The machine of the present invention is characterized by the use of a rotatable forming head; the provision of means to mount the coil of strip material concentric with the forming mandrel; the provision of means to rewind additional material on the magazine without removing the finished tube from the machine; the positioning of all of the rollers and welding apparatus within the finishing head; the provision of welding apparatus adapted to produce a strong, fluid-tight seam; and the provision of sets of serrated discs adapted to engage the finished tube to permit axial movement thereof and to anchor the same against rotary movement.

Having thus described my invention, I claim:

1. A machine for forming a tube from strip material in which the material is spirally wound and the adjacent edges thereof are secured to form a helical seam, comprising a supporting structure, a cylindrical forming head journaled for rotation on said supporting structure, a stationary forming mandrel extending into said forming head, means for feeding spirally wound strip material on said mandrel and into said forming head, and welding apparatus carried by said forming head and adapted to secure the adjacent edges of the spirally wound strip material and move said material longitudinally of said forming mandrel in response to rotation of said forming head.

2. A machine for forming a spiral tube from strip material comprising a supporting structure, a cylindrical forming head mounted for rotation on said supporting structure, welding apparatus carried by said forming head, means carried by said forming head and adapted to spirally feed strip material through said welding apparatus upon rotation of said forming head, means to anchor the formed end of the tube against rotation with said forming head, said welding apparatus being adapted to secure the edges of the adjacent convolutions of strip material to form a spiral tube in response to rotary movement of said forming head, and means to rotate said forming head relative to said supporting structure.

3. A machine for forming spiral tubes in accordance with claim 2 and being further characterized in that said means to anchor the formed end of the tube includes a set of discs adapted to rotate about an axis transverse to the longitudinal axis of the tube, the edges of said discs being adapted to engage an external portion of the tube to permit longitudinal movement thereof and to restrain rotary movement thereof.

4. A machine for forming spiral tubes in accordance with claim 3 and being further characterized in that said discs have a serrated peripheral edge adapted to engage and grip the external walls of the tube.

5. A machine for forming a spiral tube from strip material and comprising a supporting structure, a cylindrical forming head mounted for rotation on said supporting structure, a series of guiding and forming elements spirally disposed and secured within said forming head, said forming elements being adapted to form a portion on one edge of the material which overlaps the adjacent edge of the next spiral convolution of the material, a lap welding apparatus carried by said forming head and positioned therein, means carried by said forming head and adapted to spirally feed strip material through said welding apparatus to effect a welding of the overlapped edges of the spiral strip material to form a spiral tube in response to rotary movement of said forming head, means to anchor the formed end of the tube against rotation with said forming head, and means to rotate said forming head relative to said supporting structure.

6. In a machine for forming spiral tubes from a coil of strip material and having a cylindrical forming head concentric with and rotatable relative to a stationary mandrel and adapted to cooperate with the mandrel in forming a tube, a magazine journaled on said mandrel for retaining the coil of strip material and means to drive said magazine relative to said mandrel to maintain the desired tension on the material being fed to the forming head.

7. In a machine for forming spiral tubes in accordance with claim 6 and being further characterized in that a rewinding means is provided to rewind a new coil of strip material in the magazine without removing the latter from the mandrel.

8. In a machine in accordance with claim 7 and being further characterized in that said rewinding means includes collapsible jaws mounted for rotation relative to said stationary mandrel, said jaws being adapted to secure the free end of the material to be wound in the magazine in the extended position of the jaws and being adapted to release said end in the collapsed position thereof, and means to rotate said jaws relative to said magazine.

GEORGE B. KUETER.

REFERENCES CITED

The following references are of record in the file of this patent:

UNITED STATES PATENTS

| Number | Name | Date |
| --- | --- | --- |
| 1,923,284 | Taylor et al. | Aug. 22, 1933 |
| 1,939,581 | Tesmer | Dec. 12, 1933 |
| 2,443,771 | Mallett | June 22, 1948 |